US009878520B2

(12) United States Patent
Ohashi et al.

(10) Patent No.: US 9,878,520 B2
(45) Date of Patent: Jan. 30, 2018

(54) ADHESIVE SHEET

(76) Inventors: Hitoshi Ohashi, Tokyo (JP); Yoji Wakayama, Tokyo (JP); Kazuhiro Takahashi, Tokyo (JP)

(*) Notice: Subject to any disclaimer, the term of this patent is extended or adjusted under 35 U.S.C. 154(b) by 675 days.

(21) Appl. No.: 12/044,466

(22) Filed: Mar. 7, 2008

(65) Prior Publication Data

US 2008/0220253 A1   Sep. 11, 2008

(30) Foreign Application Priority Data

Mar. 9, 2007  (JP) ................................. 2007-060158

(51) Int. Cl.
*C12Q 1/68* (2006.01)
*B32B 7/12* (2006.01)

(52) U.S. Cl.
CPC ........... *B32B 7/12* (2013.01); *Y10T 428/2852* (2015.01); *Y10T 428/2878* (2015.01)

(58) Field of Classification Search
None
See application file for complete search history.

(56) References Cited

U.S. PATENT DOCUMENTS

| 4,985,343 A * | 1/1991 | Kushi ................. G03F 7/027 430/260 |
| 5,384,341 A * | 1/1995 | Itagaki et al. ................. 522/111 |
| 5,637,368 A * | 6/1997 | Cadalbert et al. ........... 428/40.1 |
| 2003/0114621 A1* | 6/2003 | Kasahara et al. .......... 526/317.1 |
| 2003/0124346 A1* | 7/2003 | Yamanaka et al. .... 428/355 AC |

FOREIGN PATENT DOCUMENTS

| JP | 10067905 A | * | 3/1998 |
| JP | 2000183140 A | | 6/2000 |
| JP | 2000212535 A | | 8/2000 |
| JP | 2005023188 A | | 1/2005 |
| JP | 2008038141 A | * | 2/2008 |

OTHER PUBLICATIONS

Tatsuya et al., JP 10-111566, Apr. 1998 (Machine Translation).*
Takeda et al., JP2008038141, Feb. 21, 2008 (Machine Translation).*
Nishioka et al., JP10067905, Mar. 10, 1998 (Machine Translation).*
Nagase ChemteX Corporation, Denacol Acrylate, accessed Jan. 2016 <http://nagaseamerica.com/wp-content/uploads/2015/02/Nagase-ChemteX-Denacol-Acrylate-TDS.pdf>.*

* cited by examiner

*Primary Examiner* — Cheng Huang
(74) *Attorney, Agent, or Firm* — The Webb Law Firm

(57) ABSTRACT

An adhesive sheet having a substrate and an adhesive layer laminated on one or both surfaces of the substrate, and which has an anti-static performance, is described. At least one of the adhesive layers contains an adhesive and a compound (1) represented by the following formula (1), and contains the compound (1) in an amount of from 0.1 to 100 parts by mass on the basis of 100 parts by mass of the adhesive.

$$R_1\text{-O-CH}_2\text{-CH(OH)-CH}_2\text{-O-}(R_2\text{-O})_n\text{-CH}_2\text{-CH(OH)-CH}_2\text{-O-}R_1 \quad (1)$$

In the formula, $R_1$ is a (meth)acryloyl group; $R_2$ is a $C_{1-4}$ alkylene group; and n is an integer of from 1 to 20, such as 4 to 16.

4 Claims, No Drawings

ADHESIVE SHEET

BACKGROUND OF THE INVENTION

1. Field of the Invention

The present invention relates to an adhesive sheet having anti-static properties. More specifically, the present invention relates to an anti-static adhesive sheet that has a substrate and an adhesive layer on one or both surfaces of the substrate.

2. Description of the Related Art

In the cutting or grinding process for semiconductor wafers, an adhesive sheet for semiconductor wafer working that is composed of an adhesive layer and a substrate film is conventionally adhered to a semiconductor wafer so as to hold the semiconductor wafer or to protect the circuit surface thereof. Prior to adhering to the semiconductor wafer, when a release sheet is peeled off from the adhesive sheet for semiconductor working, static electricity is generated, and the resulting electrically charged adhesive sheet for semiconductor working is adhered to the semiconductor wafer. In addition, after the above process, when the adhesive sheet for semiconductor wafer working is peeled off from the semiconductor wafer, static electricity is also generated, and the static electricity has caused problems of damaging circuits and others.

To address the above problems, Japanese Patent Laid-Open Publication No. 2000-212535 discloses an adhesive sheet that is obtained by coating a pressure-sensitive anti-static adhesive of an alkyl(meth)acrylate-based copolymer having at least one quaternary ammonium/organic acid salt group as a side chain.

Japanese Patent Laid-Open Publication No. 2000-183140 discloses a sheet for holding semiconductor wafers, in which a photocurable anti-static layer containing a base polymer, a photocurable compound, an anti-static agent and a photoinitiator is formed between a substrate sheet and an adhesive layer, and the photocurable anti-static layer is formed into three-dimensional network structure by UV-ray irradiation. As the anti-static agent, polyethyleneglycol and alkylolamide are used.

Japanese Patent Laid-Open Publication No. 2005-23188 discloses an adhesive for a dicing adhesive sheet containing a base polymer, a radiation curable compound having 5 or more carbon-carbon double bonds in the molecule, and a low molecular weight component having from 1 to 4 carbon-carbon double bonds in the molecule and a molecular weight of from 100 to 1,000. As the above low molecular weight component, polyalkyleneglycol(meth)acrylate or polyalkyleneglycol di(meth)acrylate is used.

SUMMARY OF THE INVENTION

However, the above pressure-sensitive adhesive that has the ionic anti-static agent and is contained in the adhesive sheet described in Japanese Patent Laid-Open Publication No. 2000-212535 possibly causes corrosion of circuits by ions. As for the sheet for holding semiconductor wafers described in Japanese Patent Laid-Open Publication No. 2000-183140, there is no anti-static measure taken in the adhesive disposed between the photocurable anti-static agent layer and semiconductor wafer, and the adhesive layer is insulating, so that the sheet as a whole has poor anti-static performance.

The adhesive sheet described in Japanese Patent Laid-Open Publication No. 2005-23188 is a dicing adhesive sheet, the main purpose of which is picking up semiconductor elements without deforming the semiconductor elements or generating transferred contamination. The adhesive sheet is not designed for the purpose of improving anti-static properties. In particular, the problem is that conventional UV curable adhesive sheets, even though treated with anti-static treatment, have a disadvantage of losing almost all of the anti-static effect after the adhesive layer is cured by UV ray irradiation.

Note that the above problems caused by the generation of static electricity are not limited to those in the adhesive sheet for semiconductor wafer working, but may be also encountered in an adhesive sheet that is composed of an adhesive layer and a substrate used in various applications.

Therefore, an object of the present invention is to provide an adhesive sheet having an excellent anti-static performance. Another object is to provide the adhesive sheet preventing wafers and circuits from corroding when the adhesive sheet is used for semiconductor wafer working.

The present inventors have made intensive studies and found that an adhesive sheet containing a specific compound may solve the above problems, and thus have accomplished the present invention.

Namely, the adhesive sheet according to the present invention is an adhesive sheet composed of a substrate and an adhesive layer laminated on one or both surfaces of the substrate, wherein at least one of the adhesive layers contains an adhesive and a compound (1) represented by the following general formula (1) in an amount of from 0.1 to 100 parts by mass on the basis of 100 parts by mass of the adhesive.

[Chemical formula 1]

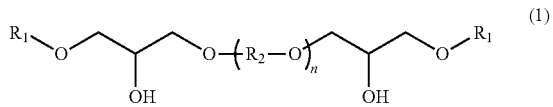

(1)

(In the formula, $R_1$ is a (meth)acryloyl group; $R_2$ is an alkylene group with carbon number of 1 to 4; and n is an integer of from 1 to 20.)

The adhesive is preferably an acrylic copolymer. Further, the acrylic copolymer preferably has an energy ray polymerizable group as a side chain. Still further, the adhesive layer preferably contains a monomer and/or an oligomer having an energy ray polymerizable group.

The adhesive layer preferably further contains a photopolymerization initiator.

The substrate is preferably an anti-static treated material.

The adhesive sheet is preferably used for semiconductor wafer working.

The adhesive sheet of the present invention has an excellent anti-static performance. When used for semiconductor wafer working, the adhesive sheet prevents wafers and circuits from corroding. When the adhesive layer contains an energy ray-curable adhesive, excellent anti-static properties are exhibited even after energy ray irradiation.

DESCRIPTION OF THE PREFERRED EMBODIMENTS

The present invention will be specifically explained below.

The adhesive sheet of the present invention has a substrate and an adhesive layer laminated on one or both surfaces of the substrate.

The substrate is not particularly limited, but is selected from known substrates as appropriate to use. The substrates may include specifically a resin film, metal foil, a metal deposited resin film, paper, and a laminate of these materials.

The resins used for the resin film may include, for example, polyolefins such as polyethylene, polypropylene, and polybutene; polyesters such as polyethylene terephthalate, polybutylene terephthalate, and polyethylene naphthalate; polyvinyl chloride, polyvinylidene chloride, polyvinyl alcohol, polystyrene, polyurethane, polycarbonate, polyamide, polyimide, polymethylmethacrylate, polybutadiene, polymethylpentene, polysulfone, polyetheretherketone, polyethersulfone, polyetherimide, cellophane, diacetyl cellulose, triacetyl cellulose, acetyl cellulose butylate, ethylene-vinylacetate copolymer, ethylene-vinylalcohol copolymer, ethylene-propylene copolymer, ethylene-(meth)acrylic acid copolymer, ethylene-(meth)acrylate copolymer, ethylene-ethyl(meth)acrylate copolymer, acrylic resin, ABS resin, fluoro resin, norbornene resin, ionomer resin, and the like. In addition, there may be used a thermoplastic elastomer containing a component such as polyolefin, polyurethane, polystyrene, polyvinyl chloride, or polyester. Among these, polyethylene terephthalate, polyethylene, and polypropylene are preferably used.

The resin films may include foamed films and cross-linked films of the above resins. The metal foils may include aluminum foil, copper foil, stainless steel foil, and the like. The metal deposited resin films may include an aluminum deposited polyethylene terephthalate film and the like. Examples of the paper may include wood-free paper, glassine paper, coated paper, laminated paper, and the like.

The laminated substrates having two or more of these substrates may be used.

The thickness of the above substrate is generally from 12 to 300 µm and preferably from 50 to 200 µm.

The substrate is preferably a film with an anti-static treatment. If the substrate has an anti-static treatment, the anti-static performance of the adhesive sheet as a whole becomes more excellent. The method of the anti-static treatment is not particularly limited, but there may be mentioned kneading and coating.

In the adhesive sheet of the present invention, at least one of the adhesive layers contains an adhesive and a compound (1). In the present specification, the adhesive layer containing the compound (1) is also referred to as the adhesive layer (1).

The adhesive contained in the adhesive layer is not particularly limited as long as the adhesive exhibits appropriate removability of wafers or chips, but there may be mentioned adhesives based on acryl, polyester, polyurethane, rubber, silicone, polyvinyl ether, and the like. Among these, the acryl-based adhesive having an acrylic copolymer as a main component is preferably used.

As the acrylic copolymers, there may be mentioned, for example, polymers that are obtained by polymerizing an alkyl(meth)acrylate that is a main component with a polar monomer (functional group-containing monomer) copolymerizable with the alkyl(meth)acrylate.

As the alkyl(meth)acrylates, alkyl(meth)acrylates with an alkyl group with carbon number of 1 to 20 are preferably used. Specifically, there may be mentioned methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, pentyl acrylate, pentyl methacrylate, hexyl acrylate, hexyl methacrylate, octyl acrylate, octyl methacrylate, 2-ethylhexyl acrylate, 2-ethylhexyl methacrylate, lauryl acrylate, lauryl methacrylate, and the like. As the polar monomers (functional group-containing monomers), there may be mentioned acrylic acid, methacrylic, acid, 2-hydroxyethyl acrylate, 2-hyroxyethyl methacrylate, and the like. The acrylic copolymers may be used alone or in a mixture of two or more kinds.

The molecular weight of the acrylic copolymer is preferably 100,000 or more and particularly preferably from 150,000 to 2,000,000. The glass transition temperature of the acrylic copolymer is generally 20° C. or lower and preferably from about −70° C. to 10° C. The acrylic copolymer has an adherence at normal temperature (23° C.).

The acrylic copolymer used as the adhesive may be an acrylic copolymer having an energy ray polymerizable group as a side chain. The acrylic copolymer having an energy ray polymerizable group as a side chain possesses both an tackiness and energy ray-curable properties, so that when the copolymer is contained in the adhesive layer, the layer is an energy ray-curable layer having still higher curable properties.

The copolymer having an energy ray polymerizable group as a side chain may be obtained by reacting an acrylic copolymer that has a functional group-containing monomer with an unsaturated group-containing compound that has a substituent having reactivity to the functional group. Such acrylic copolymers may include the above described copolymers obtained from the alkyl(meth)acrylate and the functional group-containing monomer. Examples of the unsaturated group-containing compounds may include methacryloyloxyethyl isocyanate, meta-isopropenyl-α,α-dimethylbenzyl isocyanate, methacryloyl isocyanate, allyl isocyanate, glycidyl(meth)acrylate, (meth)acrylic acid, and the like.

In the present invention, as the adhesive, the acrylic copolymers having no energy ray polymerizable group as a side chain may be used alone or in a mixture of two or more kinds, or the acrylic copolymers having an energy ray polymerizable group as a side chain may be used alone or in a mixture of two or more kinds. Further, there may be used a mixture of the acrylic copolymer having no energy ray polymerizable group as a side chain and the acrylic copolymer having an energy ray polymerizable group as a side chain. Still further, an adhesive other than the acrylic copolymers may be mixed to use.

When the mixture of the acrylic copolymer having no energy ray polymerizable group as a side chain and the acrylic copolymer having an energy ray polymerizable group as a side chain is used, it is desirable that the amount of the acrylic copolymer having an energy ray polymerizable group as a side chain is used in an amount of preferably from 1 to 1,000 parts by mass and more preferably from 10 to 100 parts by mass on the basis of 100 parts by mass of the acrylic copolymer having no energy ray polymerizable group as a side chain.

The compound (1) used in the present invention, that is, (poly)alkyleneglycol diglycidylether(meth)acrylate, is represented by the following formula (1):

[Chemical formula 2]

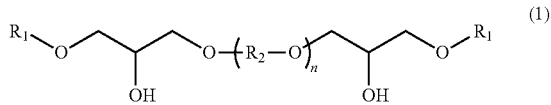

In the formula, $R_1$ is a (meth)acryloyl group, that is, an acryloyl group or a methacryloyl group.

$R_2$ is an alkylene group with carbon number of 1 to 4. The alkylene groups with carbon number of 1 to 4 may include methylene, ethylene, 1,2-propylene, 1,3-propylene, 1,2-butylene, 1,3-butylene, 1,4-butylene, and 2,3-butylene. Among these, ethylene, 1,2-propylene, and 1,3-propylene are preferable, and ethylene is more preferable in view of the anti-static performance. $R_2$ may be a structure that is derived by ring-opening reaction of a cyclic ether such as ethylene oxide, propylene oxide, 1,2-butylene oxide, 2,3-butylene oxide, oxetane, or tetrahydrofuran.

The letter "n" is an integer of from 1 to 20 and preferably from 4 to 16.

The compound (1) is anti-static and is curable by energy ray because it has the (meth)acryloyl group at the end of the molecule.

The compounds (1) may be used alone or in a mixture of two or more kinds.

The present inventors have found that the adhesive sheet containing polyalkyleneglycol(meth) acrylate in the adhesive layer as described in Japanese Patent Laid-Open Publication No. 2005-23188 exhibits only a little anti-static performance. In contrast, the compound (1) provides an excellent anti-static performance as shown in the adhesive sheet of the present invention. Such excellent anti-static performance is probably due to the compound (1) having the specific structural unit (—($R_2$—O)—) and the hydroxyl group near the molecular end. When the adhesive sheet is adhered to an adherend with the adhesive layer (1), the adherend will not be polluted because the compound (1) will not bleed out from the adhesive layer (1) unlike ionic anti-static agents and does not have any electric charge which can cause corrosion.

The compound (1) is obtained by generally known methods.

The adhesive layer (1) contains the compound (1) in an amount of generally from 0.1 to 100 parts by mass and preferably from 0.5 to 50 parts by mass on the basis of 100 parts by mass of the adhesive. When the amount of the compound (1) is less than 0.1 part by mass, anti-static effect may not be exhibited in some cases. When the amount exceeds 100 parts by mass, the holding power of the resulting adhesive sheet as described later may become poor in some cases.

In the adhesive sheet of the present invention, the adhesive layer (1) may further contain a monomer and/or an oligomer having an energy ray polymerizable group. The adhesive layer may acquire a reduced adherence when the monomer and/or the oligomer and the compound (1), which all have an energy ray polymerizable group, are polymerized and cured by energy ray irradiation, whereby the removability of the adhesive sheet may be further improved.

As the monomers and the oligomers having an energy ray polymerizable group, there may be mentioned monomers and oligomers that are capable of forming a three dimensional mesh network structure by energy ray irradiation. In detail, monomers and oligomers having two or more carbon-carbon double bonds that are the energy ray polymerizable groups are preferably used. More specifically, there may be used acrylate-based compounds such as dicyclopentadiene dimethoxydiacrylate, trimethylolpropane triacrylate, pentaerythritol triacrylate, pentaerythritol tetraacrylate, dipentaerythritol monohydroxy pentaacrylate, dipentaerythritol hexaacrylate, 1,4-butyleneglycol diacrylate, 1,6-hexanediol diacrylate, polyethyleneglycol diacrylate, oligoester acrylate, urethane acrylate-based oligomer, epoxy-modified acrylate, polyether acrylate, and itaconic acid oligomer.

The monomers having an energy ray polymerizable group may be used alone or in a mixture of two or more kinds. The oligomers having an energy ray polymerizable group may be used alone or in a mixture of two or more kinds.

The monomers and the oligomers having an energy ray polymerizable group are used in a total amount of preferably from 1 to 150 parts by mass and more preferably from 10 to 100 parts by mass on the basis of 100 parts by mass of the adhesive.

In the adhesive sheet of the present invention, the adhesive layer (1) may further contain a photopolymerization initiator. The adhesive layer that contains no photopolymerization initiator has properties of being cured by irradiation of electron beam, X rays, γ-rays and the like (energy ray-curable properties). As opposed to this, when the photopolymerization initiator is contained in the adhesive layer, the adhesive layer may be cured by irradiation of UV ray that is easy to handle as an energy ray.

For such UV-curable adhesive sheet, a substrate that is UV-transmissible is preferably used.

The photopolymerization initiators used in the present invention may include benzophenone, acetophenone, benzoin, benzoin methylether, benzoin ethylether, benzoin isopropylether, benzoin isobutylether, benzoin benzoic acid, methylbenzoin benzoate, benzoin dimethylketal, 2,4-diethyl thioxanthone, 1-hydroxycyclohexyl phenylketone, benzyldiphenyl sulfide, tetramethylthiuram monosulfide, azobisisobutyronitrile, benzyl, dibenzyl, diacetyl, 2-chloroanthraquinone, 2,4,6-trimethylbenzoyl diphenylphosphine oxide, 2-benzothiazole-N,N-diethyldithiocarbamate, oligo{2-hydroxy-2-methyl-1-[4-(1-propenyl)phenyl]propanone}, and the like. The photopolymerization initiators may be used alone or in a mixture of two or more kinds.

The adhesive layer (1) contains the photopolymerization initiator in an amount of generally from 0.1 to 10 parts by mass and preferably from 1 to 5 parts by mass on the basis of 100 parts by mass of the adhesive.

Further, the adhesive layer (1) may contain additional components together with the adhesive and compound (1) as long as the objective of the present invention is not impaired. The additional components may include a curing agent, an inorganic filler, a plasticizer, an anti-static agent other than the compound (1), an antioxidant, pigment, dye, and the like. These may be used alone or in a mixture of two or more kinds.

The curing agent may be added in order to control the initial adhesion and cohesion of the adhesive layer. The curing agents may include organic polyisocyanate compounds and organic polyimine compounds.

The organic polyisocyanate compounds may include aromatic polyisocyanate compounds and aliphatic polyisocyanate compounds. The organic polyisocyanate compounds may include, more specifically, 2,4-tolylene diisocyanate, 2,6-tolylene diisocyanate, 1,3-xylylene diisocyanate, 1,4-xylylene diisocyanate, diphenylmethane-4,4'-diisocyanate, diphenylmethane-2,4-diisocyanate, 3-methyldiphenylmethane diisocyanate, hexamethylene diisocyanate, isophorone diisocyanate, dicyclohexylmethane-4,4'-diisocyanate, dicyclohexylmethane-2,4'-diisocyanate, lysine isocyanate, and trimers of these polyisocyanate compounds; and isocyanate-terminated urethane prepolymers that are obtained by the reaction between these polyisocyanate compounds and polyol compounds; and the like. Specific examples of the organic polyimine compounds may include N,N'-diphenylmethane-4,4'-bis(1-aziridine carboxyamide), trimethylolpropane-tri-β-aziridinyl propionate, tetramethylolmethane-tri-β-aziridinyl propionate, N,N'-toluene-2,4-bis(1-aziridine carboxyamide)triethylene melamine, and the like.

The curing agent is used in an amount of generally from 0.01 to 20 parts by mass, preferably from 0.1 to 15 parts by mass, and more preferably from 0.5 to 10 parts by mass on the basis of 100 parts by mass of the adhesive.

The thickness of the adhesive layer (1) is generally from 1 to 200 μm and preferably from 5 to 100 μm.

The adhesive sheet of the present invention may have the adhesive layer (1) laminated on one surface of the substrate or on both surfaces of the substrate. Further, the adhesive layer (1) may be laminated on one surface of the substrate, and another adhesive layer that does not contain the compound (1) may be laminated on the other surface. In the present specification, the adhesive layer that does not contain the compound (1) is also referred to as the other adhesive layer.

The adhesive contained in the other adhesive layer is not particularly limited, and may have removability similarly to the adhesive layer (1) or may be strong adhesion. The adhesives may include adhesives based on acryl, polyester, polyurethane, rubber, silicone, polyvinylether, and the like. Among these, the acryl-based adhesive containing the aforementioned acrylic copolymer as a main component is preferably used. In the other adhesive layer, the additional components may be contained similarly to the adhesive layer (1).

The method for producing the adhesive sheet of the present invention is not particularly limited. For example, the constituent components of the adhesive layer (1) are dissolved or dispersed each in the aforementioned ratios in an appropriate solvent to prepare an adhesive composition. Then, by known means such as roll coater, knife coater, gravure coater, die coater, and reverse coater, the adhesive composition is applied and dried on the aforementioned substrate in an appropriate thickness to produce the adhesive sheet. After the adhesive sheet is produced, optionally a release sheet may be applied onto the adhesive layer (1) to protect the adhesive layer (1). Alternatively, after the adhesive composition is applied and dried in an appropriate thickness on a release sheet, the substrate may be laminated on the adhesive layer (1) to produce the adhesive sheet. The other adhesive layer may be prepared in the same manner as above.

The adhesive sheet obtained as described above shows excellent anti-static performance irrespective of whether the adhesive layer is used without being cured by energy ray or the adhesive layer is cured by energy ray. When the adhesive layer is cured by energy ray, the adhesive sheet shows excellent anti-static performance before the adhesive layer is cured and does not sharply reduce the anti-static performance even after the curing.

The adhesive sheet thus obtained has a holding power of generally 50,000 seconds or more and preferably 70,000 seconds or more, thus exhibiting an excellent adhesive characteristic. At less than 50,000 seconds of the holding power, the adhesive may possibly remain on an adherend when the adhesive sheet is peeled off. Further, with such low holding power, when the adhesive sheet is used as a dicing sheet, the sheet may be possibly come off from a ring frame in an expanding process as described later. In the adhesive sheet of the present invention, the deficiency of holding power is unlikely to occur even though the content of the compound (1) is increased so as to increase anti-static performance.

The adhesive sheet of the present invention is preferably used, for example, as a surface protection sheet for backgrinding of a wafer, a dicing sheet in semiconductor working, and the like. Hereinafter, the use of the adhesive sheet as a surface protection sheet and a dicing sheet will be specifically explained.

When the adhesive sheet of the present invention is used as a surface protection sheet for backgrinding of a wafer, firstly a semiconductor wafer is provided which has circuit patterns formed on the surface thereof in the usual method. Then, the adhesive layer (1) of the adhesive sheet is adhered to the circuit surface to protect the circuit surface of the wafer and to hold the wafer. The adhesive sheet may have the adhesive layer laminated on one or both surfaces thereof as above mentioned. When the adhesive sheet has the adhesive layer laminated on both surfaces thereof, it is desirable that the adhesive layer laminated on the opposite side to the surface that will be stuck to the wafer is stuck to a transparent hard plate such as glass. After the adhesive sheet is stuck to the wafer, given processes including mechanical backgrinding of the wafer are carried out in the usual method, and then the adhesive sheet is peeled off as appropriate.

When the adhesive sheet of the present invention is used as a dicing sheet, firstly the adhesive sheet is adhered to the back surface of a semiconductor wafer with the adhesive layer (1). Usually the dicing sheet is adhered with an apparatus called a mounter equipped with a roller. Then, after the periphery of the adhesive sheet is held with a ring frame, the wafer is diced into chips with a dicing apparatus having a dicing blade. Then, after the chips are optionally pulled away from each other by expanding the adhesive sheet, the chips are picked up from the adhesive sheet. Usually, the chips are picked up by suction from the side of the circuit surface with a suction collet. Simultaneously with suction by the collet, the chips may be pushed up by thrust pins from the side of the adhesive sheet.

In the aforementioned uses of the adhesive sheet of the present invention, the circuits are hardly damaged, because the generation of static electricity is prevented when the wafer or chips are separated from the adhesive sheet after the given processes are completed. Further, corrosion of the circuits is prevented because the compound (1) that is used in the adhesive sheet of the present invention is not an ionic compound.

The present inventors have found that the anti-static performance of the adhesive sheet as described in Japanese Patent Laid-Open Publication No. 2005-23188 that contains polyalkyleneglycol(meth)acrylate in the adhesive layer is still more lowered by energy ray irradiation. In contrast to this, the adhesive sheet of the present invention exhibits an excellent anti-static performance even after energy ray irradiation. This advantage is probably because the compound (1) has the specific structural unit (—($R_2$—O)—) and the hydroxyl group in the vicinity of the molecule end.

The adhesive sheet that is used as a surface protection sheet maintains the anti-static properties even if the adhesive layer (1) is irradiated with an energy ray after the given processes. Thus, static electricity is not generated when the adhesive sheet is peeled off, and therefore the circuits will not be damaged. The adhesive sheet that is used as a dicing sheet maintains the anti-static properties even after the irradiation of energy ray. Thus, static electricity is not generated when the chips are picked up, and therefore the circuits will not be damaged. Therefore, the adhesive sheet of the present invention may provide a still more improved productivity in semiconductor production.

The adhesive sheet of the present invention has excellent anti-static properties before and after the adhesive is cured, and also has excellent adhesive characteristic, so that the sheet is not only used as the aforementioned surface protection sheet, dicing sheet, and the like for semiconductor working, but also preferably used as a surface protection sheet and the like in the production and working of polarizing plates and liquid crystals. Further, the adhesive sheet of the present invention may be used for all of the applications requiring the removability, in which the adhesive sheet of the present invention is adhered to an adherend and then peeled off.

The present invention will be described more specifically with reference to the following examples, but it should be construed that the present invention is in no way limited to those examples.

EXAMPLES

Measurement Method
1. Measurement of Electrostatic Voltage

Before UV Ray Irradiation:

The adhesive sheet cut to 40 mm×40 mm was put on a turntable of an instrument for measuring electrostatic voltage potential ("STATIC HONESTMER" (trade name), SHISHIDO SHOKAI Co., Ltd.) with the adhesive layer side up. Then, while the sheet was rotated at 1,300 rpm, the electrostatic voltage of the adhesive layer face of the adhesive sheet was measured after an elapsed time of 60 seconds at a voltage of 10 kV was applied.

After UV Ray Irradiation:

In a similar method to the above, the electrostatic voltage of the adhesive sheet after UV ray irradiation was also measured. UV ray was irradiated to the adhesive sheet cut to 40 mm×40 mm, using "RAD-2000 m/12" (trade name), Lintec Corporation, at an illuminance of 160 mW/cm² and a quantity of light of 220 mJ/cm².

2. Measurement of Holding Power

In an environment of 23° C. and 50% RH, to the surface of a stainless steel plate (SUS304) polished with an abrasive paper #360, the adhesive sheet (composed of the substrate and the adhesive layer) cut to 25 mm×75 mm was stuck through the adhesive layer in such a method that the adhesive sheet and the surface of stainless steel plate were brought into contact with each other in an area of 25 mm×25 mm. Then, the adhesive sheet stuck to the stainless steel plate was left for 20 minutes. After the adhesive sheet stuck to the stainless steel plate was transferred into a 40° C. oven and left for 20 minutes, it was still left in the oven while a weight was attached in such a method that a load of 1 kg was applied to the adhesive sheet in a shearing direction thereof to measure the holding power of the adhesive sheet in accordance with JIS Z 0237.

3. Measurement of Adhesion

In accordance with the measurement method for adhesion as defined in JIS Z 0237, adhesion was measured by the following procedure.

Before UV Ray Irradiation:

In an environment of 23° C. and 50% RH, the adhesive sheet was stuck using a 2 kg rubber roller to an adherend that was a SUS304 plate with a mirror face (arithmetic average surface roughness Ra=0.05 μm). After a lapse of 20 minutes, peel strength was measured with a universal tensile tester ("TENSILON UTM-4-100" (trade name), ORIENTEC Co., Ltd.) at a peel angle of 180° and a peel speed of 300 mm/min. The thus measured value was used as an adhesion value before UV ray irradiation.

After UV Ray Irradiation:

In an environment of 23° C. and 50% RH, the adhesive sheet was stuck using a 2 kg rubber roller to an adherend that was a SUS304 plate with a mirror face (arithmetic average surface roughness Ra=0.05 μm) After a lapse of 20 minutes, UV ray was applied from the side of the substrate ("RAD-2000 m/12" (trade name), Lintec Corporation, at an illuminance of 220 mW/cm² and a quantity of light of 160 mJ/cm²) Then, peel strength was measured by using the same method as described above. The thus measured value was used as an adhesion value after UV ray irradiation.

Example 1

An adhesive composition was prepared by mixing (on the basis of solid mass ratio) 100 parts by mass of an acrylic copolymer (a copolymer obtained from 94 parts by mass of n-butyl acrylate and 6 parts by mass of acrylic acid, having a weight-average molecular weight of from 500,000 to 600,000), 2.2 parts by mass of an organic polyisocyanate compound ("Coronate L" (trade name), Nippon Polyurethane Industry Co., Ltd.) serving as a curing agent, 1.5 parts by mass of 1-hydroxycyclohexyl phenylketone serving as a photopolymerization initiator ("IRGACURE 184" (trade name) Ciba Specialty Chemicals Inc.), and 50 parts by mass of polyethyleneglycol diglycidylether acrylate that was represented by the following formula (A) and serving as the compound (1) (n13, "NK Oligo EA-5824" (trade name), Shin-Nakamura Chemical Co., Ltd.). The adhesive composition was coated and dried on a release film so that the dry thickness became 30 μm, to obtain a laminated film. On a 50 μm thick polyethylene terephthalate (PET) film ("Lumirror 50T60" (trade name), Toray Industries Inc.) serving as a film substrate, the laminated film was laminated through the adhesive layer to obtain an adhesive sheet (see Table 1).

The adhesive sheet was evaluated by the aforementioned measurement methods (Table 3).

[Chemical formula 3]

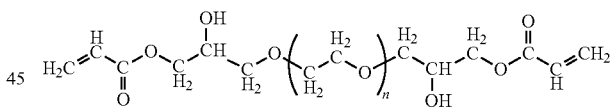

(A)

Example 2

An adhesive sheet was prepared similarly to Example 1, except that polyethyleneglycol diglycidylether acrylate was replaced by polypropyleneglycol diglycidylether acrylate (n=11, "NK Oligo EA-5923" (trade name), Shin-Nakamura Chemical Co., Ltd.) in the preparation of the adhesive composition (see Table 1)

The adhesive sheet was evaluated by the aforementioned measurement methods (Table 3).

Example 3

An adhesive sheet was prepared similarly to Example 1, except that polyethyleneglycol diglycidylether acrylate was used in an amount of 0.5 part by mass in place of 50 parts by mass (on the basis of solid mass ratio) in the preparation of the adhesive composition, and that a 50 μm thick PET film with an anti-static treatment ("Lumirror 50T83" (trade name), Toray Industries Inc.) was used as the substrate film in place of the 50 µm thick PET film, and the laminated film was laminated on the anti-static face of the substrate (see Table 1).

The adhesive sheet was evaluated by the aforementioned measurement methods (Table 3).

Examples 4

An adhesive sheet was prepared similarly to Examples 2, except that polypropyleneglycol diglycidylether acrylate was used in an amount of 0.5 part by mass in place of 50 parts by mass (on the basis of solid mass ratio) in the preparation of the adhesive composition, and that a 50 µm thick PET film with an anti-static treatment ("Lumirror 50T83" (trade name), Toray industries Inc.) was used as the substrate film in place of the 50 µm thick PET film, and the laminated film was laminated on the anti-static surface of the substrate (see Table 1).

The adhesive sheet was evaluated by the aforementioned measurement methods (Table 3).

Example 5

An adhesive sheet was prepared similarly to Example 1, except that 30 parts by mass of a monomer having an energy ray polymerizable group ("KAYARAD DPHA" (trade name), Nippon Kayaku Co., Ltd.) were further added in the preparation of the adhesive composition, and that a 50 µm thick PET film with an anti-static treatment ("Lumirror 50T83" (trade name), Toray Industries Inc.) was used as the substrate film in place of the 50 µm thick PET film, and the laminated film was laminated on the anti-static surface of the substrate (see Table 1).

The adhesive sheet was evaluated by the aforementioned measurement methods (Table 3).

Example 6

An adhesive sheet was prepared similarly to Example 1, except that a 80 µm thick ethylene-methacrylic acid copolymer film ((EMAA) having a methacrylic acid copolymer ratio of 9 mass %) was used as the substrate film in place of the 50 µm thick PET film (see Table 1).

The adhesive sheet was evaluated by the aforementioned measurement methods (Table 3).

Example 7

An adhesive sheet was prepared similarly to Example 1, except that 1-hydroxycyclohexyl phenylketone that served as a photopolymerization initiator was not added in the preparation of the adhesive composition (see Table 1).

The adhesive sheet was evaluated by the aforementioned measurement methods (Table 3).

Example 8

An adhesive sheet was prepared similarly to Example 1, except that an acrylic copolymer having an energy ray polymerizable group as a side chain (a copolymer obtained by adding 30 parts by mass of methacryloyloxyethyl isocyanate to 100 parts by mass of an acrylic copolymer obtained from 62 parts by mass of n-butyl acrylate, 10 parts by mass of methyl methacrylate, and 28 parts by mass of 2-hydroxyethyl acrylate and having a weight-average molecular weight of from 500,000 to 600,000) was used in place of the acrylic copolymer (a copolymer obtained from 94 parts by mass of n-butyl acrylate and 6 parts by mass of acrylic acid, having a weight-average molecular weight of from 500,000 to 600,000) in the preparation of the adhesive composition (see Table 1).

The adhesive sheet was evaluated by the aforementioned measurement methods (Table 3).

Example 9

An adhesive sheet was prepared similarly to Example 1, except that polyethyleneglycol diglycidylether acrylate was added in an amount of 80 parts by mass in place of 50 parts by mass (on the basis of solid mass ratio) and that the organic polyisocyanate compound serving as a curing agent was added in an amount of 10 parts by mass in place of 2.2 parts by mass (on the basis of solid mass ratio) in the preparation of the adhesive composition (see Table 1).

The adhesive sheet was evaluated by the aforementioned measurement methods (see Table 3).

Comparative Example 1

An adhesive sheet was prepared similarly to Example 1, except that the compound (1) was not added in the preparation of the adhesive composition (see Table 2).

The adhesive sheet was evaluated by the aforementioned measurement methods (Table 3).

Comparative Example 2

An adhesive sheet was prepared similarly to Example 5, except that the compound (1) was not added in the preparation of the adhesive composition, and that a 50 µm thick PET film ("Lumirror 50T60" (trade name), Toray Industries Inc.) was used as the substrate film in place of the 50 µm thick PET film with an anti-static treatment (see Table 2).

The adhesive sheet was evaluated by the aforementioned measurement methods (Table 3).

Comparative Example 3

An adhesive sheet was prepared similarly to Example 5, except that the compound (1) was not added in the preparation of the adhesive composition (see Table 2).

The adhesive sheet was evaluated by the aforementioned measurement methods (Table 3).

Comparative Example 4

An adhesive sheet was prepared similarly to Example 1, except that polyethyleneglycol diglycidylether acrylate was replaced by bisphenol A epoxy acrylate represented by the following formula (B) ("NK Oligo EA-1020" (trade name), Shin-Nakamura Chemical Co., Ltd.) in the preparation of the adhesive composition (see Table 2).

The adhesive sheet was evaluated by the aforementioned measurement methods (Table 3).

[Chemical formula 4]

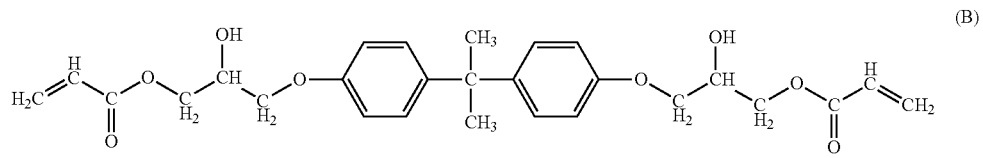
(B)

Comparative Example 5

An adhesive sheet was prepared similarly to Example 1, except that polyethyleneglycol diglycidylether acrylate was replaced by polyethyleneglycol diacrylate represented by the following formula (C) (m=9, "NK Ester A-400" (trade name), Shin-Nakamura Chemical Co., Ltd.) in the preparation of the adhesive composition (see Table 2).

The adhesive sheet was evaluated by the aforementioned measurement methods (Table 3).

[Chemical formula 5]

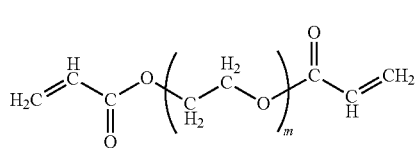
(C)

Comparative Example 6

An adhesive sheet was prepared similarly to Example 1, except that polyethyleneglycol diglycidylether acrylate (n=13, "NK Oligo EA-5824" (trade name), Shin-Nakamura Chemical Co., Ltd.) was added in an amount of 150 parts by mass (on the basis of solid mass ratio) in the preparation of the adhesive composition (see Table 2).

The adhesive sheet was evaluated by the aforementioned measurement methods (Table 3).

As shown in Table 3, the adhesive sheets of the invention proved extremely excellent anti-static properties, with the electrostatic voltage being less than 1 kV before the curing of the adhesive layer and being less than 2 kV even after the adhesive layer was cured. Further, the adhesive sheets showed excellent adhesive characteristic.

TABLE 1

|  | Adhesive composition | | | | Substrate | |
| --- | --- | --- | --- | --- | --- | --- |
|  | Compound (1) | | | Monomer having energy | | Anti-static |
|  | OH group | $R_2$ | Parts by mass | ray polymerizable group (parts by mass) | Substrate | treatment of substrate |
| Example 1 | Present | Ethylene | 50 | — | PET | No |
| Example 2 | Present | Propylene | 50 | — | PET | No |
| Example 3 | Present | Ethylene | 0.5 | — | PET | Yes |
| Example 4 | Present | Propylene | 0.5 | — | PET | Yes |
| Example 5 | Present | Ethylene | 50 | 30 | PET | Yes |
| Example 6 | Present | Ethylene | 50 | — | Ethylene-methacrylic acid copolymer | No |
| Example 7 | Present | Ethylene | 50 | — | PET | No |
| Example 8 | Present | Ethylene | 50 | — | PET | No |
| Example 9 | Present | Ethylene | 80 | — | PET | No |

TABLE 2

|  | Adhesive composition | | | | Substrate | |
| --- | --- | --- | --- | --- | --- | --- |
|  | Compound | | | Monomer having energy | | Anti-static |
|  | OH group | $R_2$ | Parts by mass | ray polymerizable group (parts by mass) | Substrate | treatment of substrate |
| Comparative Example 1 | — | — | — | — | PET | No |
| Comparative Example 2 | — | — | — | 30 | PET | No |
| Comparative Example 3 | — | — | — | 30 | PET | Yes |

TABLE 2-continued

| | Adhesive composition | | | | Substrate | |
|---|---|---|---|---|---|---|
| | Compound | | | Monomer having energy | | Anti-static |
| | OH group | $R_2$ | Parts by mass | ray polymerizable group (parts by mass) | Substrate | treatment of substrate |
| Comparative Example 4 | Present | Bisphenol A | 50 | — | PET | No |
| Comparative Example 5 | Absent | Ethylene | 50 | — | PET | No |
| Comparative Example 6 | Present | Ethylene | 150 | — | PET | No |

TABLE 3

| | Electrostatic voltage (kV) | | | Adhesion (mN/25 mm) | |
|---|---|---|---|---|---|
| | Before UV irradiation | After UV irradiation | Holding power (sec) | Before UV irradiation | After UV irradiation |
| Example 1 | 0.26 | 1.20 | 70000Nc | 1800 | 300 |
| Example 2 | 0.98 | 1.80 | 70000Nc | 2300 | 400 |
| Example 3 | 0.25 | 1.05 | 70000Nc | 13000 | 13000 |
| Example 4 | 0.38 | 1.52 | 70000Nc | 13500 | 13500 |
| Example 5 | 0.05 | 0.51 | 70000Nc | 7200 | 100 |
| Example 6 | 0.21 | 1.31 | 70000Nc | 1900 | 400 |
| Example 7 | 0.26 | — | 70000Nc | 1800 | — |
| Example 8 | 0.25 | 1.35 | 70000Nc | 1200 | 100 |
| Example 9 | 0.13 | 0.75 | 70000Nc | 2400 | 250 |
| Comparative Example 1 | 2.30 | — | 70000Nc | 13500 | — |
| Comparative Example 2 | 2.30 | 2.30 | 70000Nc | 18000 | 100 |
| Comparative Example 3 | 0.65 | 2.05 | 70000Nc | 18000 | 100 |
| Comparative Example 4 | 1.63 | 2.30 | 70000Nc | 11000 | 200 |
| Comparative Example 5 | 1.43 | 2.30 | 1000Cf | 500 | 300 |
| Comparative Example 6 | 0.12 | 0.52 | 100Cf | 200 | 100 |

Nc: no creep
Cf: cohesion failure

What is claimed is:

1. An adhesive sheet having a substrate and an adhesive layer laminated on one or both surfaces of the substrate wherein:
at least one of the adhesive layers consists of an adhesive, a compound (1) represented by the following general formula (1) in an amount of from 0.1 to 100 parts by mass on the basis of 100 parts by mass of the adhesive, a monomer and/or an oligomer having an energy ray polymerizable group, and optionally a component(s) selected from the group consisting of a photopolymerization initiator, a curing agent, an inorganic filler, a plasticizer, an anti-static agent other than the compound (1), an antioxidant, pigment, and dye,

[Chemical formula 1]

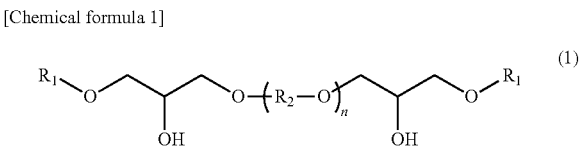

(1)

wherein $R_1$ is a (meth)acryloyl group; $R_2$ is ethylene; and n is an integer of from 11 to 13,
wherein the adhesive consists of an acrylic copolymer having an energy ray polymerizable group as a side chain and a weight-average molecular weight of from 150,000 to 2,000,000,
wherein the monomer and/or the oligomer having an energy ray polymerizable group are selected from the group consisting of dicyclopentadiene methoxydiacrylate, trimethylolpropane triacrylate, pentaerythritol triacrylate, pentaerythritol tetraacrylate, dipentaerythritol monohydroxy pentaacrylate, dipentaerythritol hexaacrylate, 1,4-butyleneglycol diacrylate, polyethyleneglycol diacrylate, oligoester acrylate, urethane acrylate-based oligomer, epoxy-modified acrylate, polyether acrylate, and itaconic acid olibomer, and
wherein said adhesive layer has reduced adhesiveness after being polymerized and cured by energy ray radiation, and whereby said adhesive sheet has improved removability compared to prior to said adhesive layer being polymerized and cured by energy ray radiation.

2. The adhesive sheet according to claim 1, wherein the adhesive layer further contains a photopolymerization initiator.

3. The adhesive sheet according to claim 1, which is used for semiconductor wafer working.

4. The adhesive sheet according to claim 2, which is used for semiconductor wafer working.

* * * * *

UNITED STATES PATENT AND TRADEMARK OFFICE
CERTIFICATE OF CORRECTION

PATENT NO. : 9,878,520 B2
APPLICATION NO. : 12/044466
DATED : January 30, 2018
INVENTOR(S) : Hitoshi Ohashi et al.

It is certified that error appears in the above-identified patent and that said Letters Patent is hereby corrected as shown below:

In the Claims

Column 16, Line 41, Claim 1, delete "olibomer," and insert -- oligomer, --

Signed and Sealed this
Second Day of April, 2019

Andrei Iancu
*Director of the United States Patent and Trademark Office*